(12) United States Patent
Oh et al.

(10) Patent No.: US 12,328,236 B2
(45) Date of Patent: Jun. 10, 2025

(54) CREDENTIAL INFORMATION MANAGEMENT IN NETWORK

(71) Applicant: RAKUTEN MOBILE, INC., Tokyo (JP)

(72) Inventors: Jayoung Oh, Tokyo (JP); Tomomi Kanai, Tokyo (JP); Hiroyuki Jo, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/008,303

(22) PCT Filed: Jul. 28, 2022

(86) PCT No.: PCT/JP2022/029102
§ 371 (c)(1),
(2) Date: Dec. 5, 2022

(87) PCT Pub. No.: WO2024/024021
PCT Pub. Date: Feb. 1, 2024

(65) Prior Publication Data
US 2024/0267301 A1 Aug. 8, 2024

(51) Int. Cl.
*H04L 41/28* (2022.01)
*G06F 16/176* (2019.01)
*G06F 16/23* (2019.01)
*H04L 9/08* (2006.01)

(52) U.S. Cl.
CPC .......... *H04L 41/28* (2013.01); *G06F 16/1774* (2019.01); *G06F 16/2343* (2019.01); *H04L 9/0891* (2013.01)

(58) Field of Classification Search
CPC ... H04L 41/28; H04L 9/0891; G06F 16/1774; G06F 16/2343
See application file for complete search history.

(56) References Cited

U.S. PATENT DOCUMENTS

| | | | |
|---|---|---|---|
| 2002/0165929 A1* | 11/2002 | McLaughlin | H04L 41/0803 709/213 |
| 2013/0318058 A1* | 11/2013 | Fries | G06F 16/2365 707/703 |
| 2016/0019253 A1* | 1/2016 | Chan | G06F 16/2343 707/704 |
| 2016/0212128 A1* | 7/2016 | Pike | H04L 63/108 |

(Continued)

FOREIGN PATENT DOCUMENTS

WO 2016/121802 A1 8/2016

*Primary Examiner* — Glenton B Burgess
*Assistant Examiner* — Jihad K Boustany
(74) *Attorney, Agent, or Firm* — Sughrue Mion, PLLC

(57) ABSTRACT

A credential management apparatus performs a change process, an acquisition process, and a locking process. The change process is processing that periodically changes credential information of components that constitute a network. The acquisition process is processing that acquires maintenance operation information related to a maintenance operation of the network. The locking process is processing that locks the credential information of, among the components, a target component for the maintenance operation not to be changed based on the maintenance operation information, at least during the period while the maintenance operation is being performed.

9 Claims, 9 Drawing Sheets

(56) References Cited

U.S. PATENT DOCUMENTS

| | | | |
|---|---|---|---|
| 2017/0300869 A1* | 10/2017 | Johnson | G06F 16/2343 |
| 2018/0024852 A1 | 1/2018 | Yabushita et al. | |
| 2022/0114157 A1* | 4/2022 | Rangasamy | G06F 8/65 |

* cited by examiner

CREDENTIAL INFORMATION MANAGEMENT IN NETWORK

CROSS REFERENCE TO RELATED APPLICATIONS

This application is a National Stage of International Application No. PCT/JP2022/029102 filed Jul. 28, 2022.

TECHNICAL FIELD

The present disclosure relates to management of credential information in networks.

BACKGROUND ART

With a background of improved performance of general-purpose servers and enhanced network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Non-Patent Literature

PATENT LITERATURE 1: International Publication of PCT International Patent Application No. WO2016/121802 A

SUMMARY OF THE INVENTION

Problems to be Solved by the Invention

Telecom services require a high level of security because they are large-scale networks that handle users' strictly personal information.

In a telecom network, credential information (i.e., server passwords) is encrypted and managed for each of components, such as servers, that constitute the network. Furthermore, the encrypted credential information is periodically changed so as to enhance security. This credential information may be changed automatically at predetermined times.

On the other hand, in a telecom network, in some cases a maintenance operation is required unexpectedly due to, for example, server failures. Telecom networks require high reliability and high availability, thus when a failure occurs in the telecom network, promptness to recovery is required. Therefore, it is necessary to complete the maintenance operation expeditiously.

However, when the credential information is changed during the maintenance operation as described above, the maintenance operation may be interrupted or an extra operation to confirm new credential information may be incurred, which increases maintenance time and, consequently, network outage time.

Therefore, the present disclosure addresses problems to suppress the increase in maintenance operation time in a large-scale network.

Solution to Problems

In order to solve the above mentioned problems, according to one aspect of the present disclosure, there is provided a credential management apparatus comprising one or more processors, at least one of the one or more processors being configured to perform a change process, an acquisition process, and a locking process. The change process is processing that periodically changes credential information of components that constitute a network. The acquisition process is processing that acquires maintenance operation information related to a maintenance operation of the network. The locking process is processing that locks the credential information of, among the components, a target component for the maintenance operation not to be changed based on the maintenance operation information, at least during the period while the maintenance operation is being performed.

In order to solve the above mentioned problems, according to another aspect of the present disclosure, there is provided a credential management method, comprising: acquiring maintenance operation information related to a maintenance operation of a network; and locking, among components that constitute the network, credential information of a target component for the maintenance operation not to be changed based on the maintenance operation information, at least during the period while the maintenance operation is being performed.

In order to solve the above mentioned problems, according to yet another aspect of the present disclosure, there is provided a credential management system comprising one or more processors, at least one of the one or more processors being configured to perform a change process, an acquisition process, and a locking process. The change process is processing that periodically changes credential information of components that constitute a network. The acquisition process is processing that acquires maintenance operation information related to a maintenance operation of the network. The locking process is processing that locks the credential information of, among the components, a target component for the maintenance operation not to be changed based on the maintenance operation information, at least during the period while the maintenance operation is being performed.

Advantageous Effect of the Invention

According to one aspect of the present disclosure, it makes it possible to suppress the increase in maintenance operation time in a large-scale network.

DESCRIPTION OF EMBODIMENTS

Figure 1:
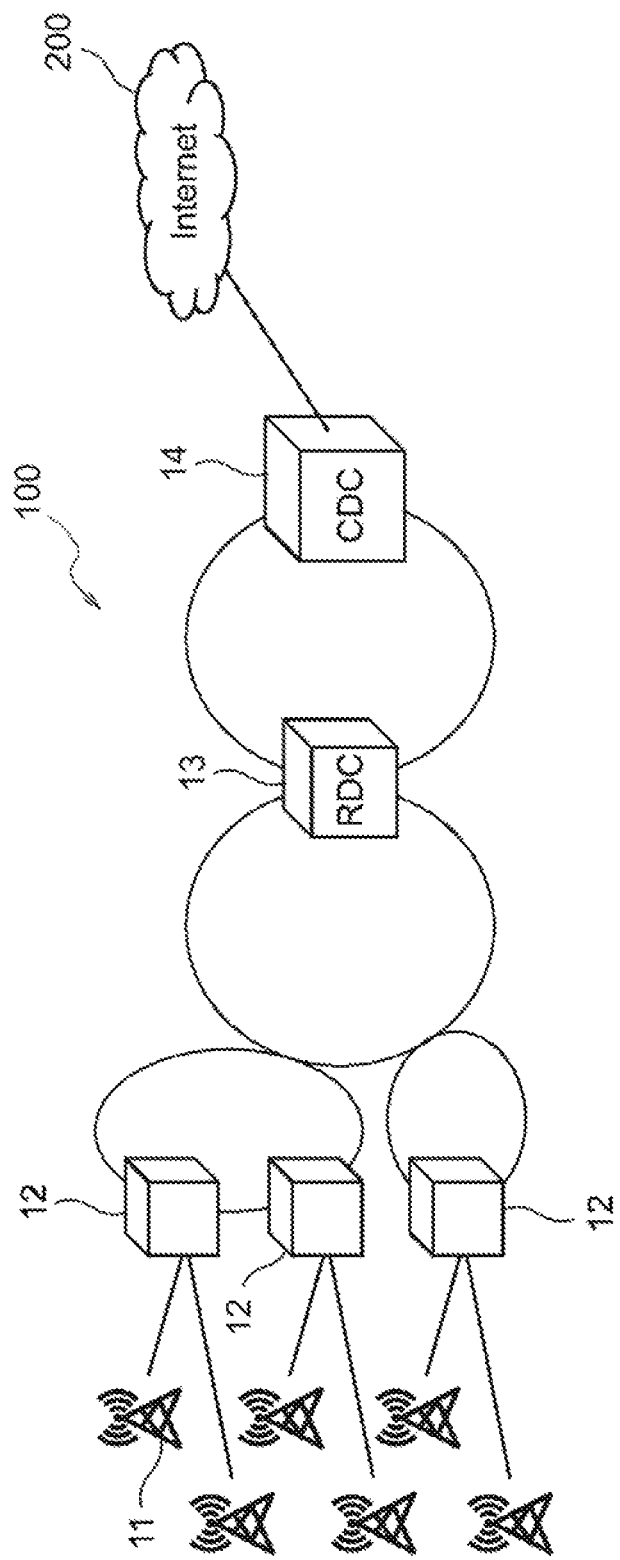
FIG. 1 is a schematic diagram illustrating an exemplary network configuration of a mobile network including a credential management apparatus according to the present embodiment.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a credential management apparatus according to the present embodiment has a credential management function that manages credential information of components constituting a mobile network.

More specifically, the credential management apparatus has a function to periodically change the credential information of components that constitute the mobile network. Here, "periodically" is not limited to processing at each predetermined fixed period of time, but also includes processing at predetermined times without a fixed processing interval, such as processing on the first day of each month or processing on the first Monday of each month.

The credential management apparatus also acquires maintenance operation information related to maintenance operations on the network, and based on the maintenance operation information, locks the credential information of a target component for the maintenance operation so as not to be changed at least while the maintenance operation is being performed.

Here, the maintenance operation includes a planned maintenance operation to add or change network functions, as well as an unexpected maintenance operation to deal with network failures.

FIG. 1 is a conceptual diagram illustrating an exemplary network configuration of a mobile network 100 including a credential management apparatus according to the present embodiment.

In the mobile network 100 shown in FIG. 1, a terminal capable of mobile communication such as a smartphone and the Radio Access Network (RAN) communicate with each other wirelessly, and the transmitted information is relayed through the backhaul network (i.e., Mobile Backhaul: MBH) to the core network for processing. This allows the mobile communication terminal to connect to the Internet 200 or connect to another carrier's network to make voice calls, or the like.

More specifically, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment may be a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like.

The edge data center 12 is deployed near the base stations 11 and is connected to a plurality of base stations 11 via fiber-optic cables, or the like. The edge data center 12 realizes the RAN-related radio access functions.

The regional data center 13 is connected to a plurality of edge data centers 12 deployed in target regions, respectively. The regional data center 13 realizes various applications by software, for the firewall/NAT (Network Address Translation), the CDN (Content Distribution Network), and edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
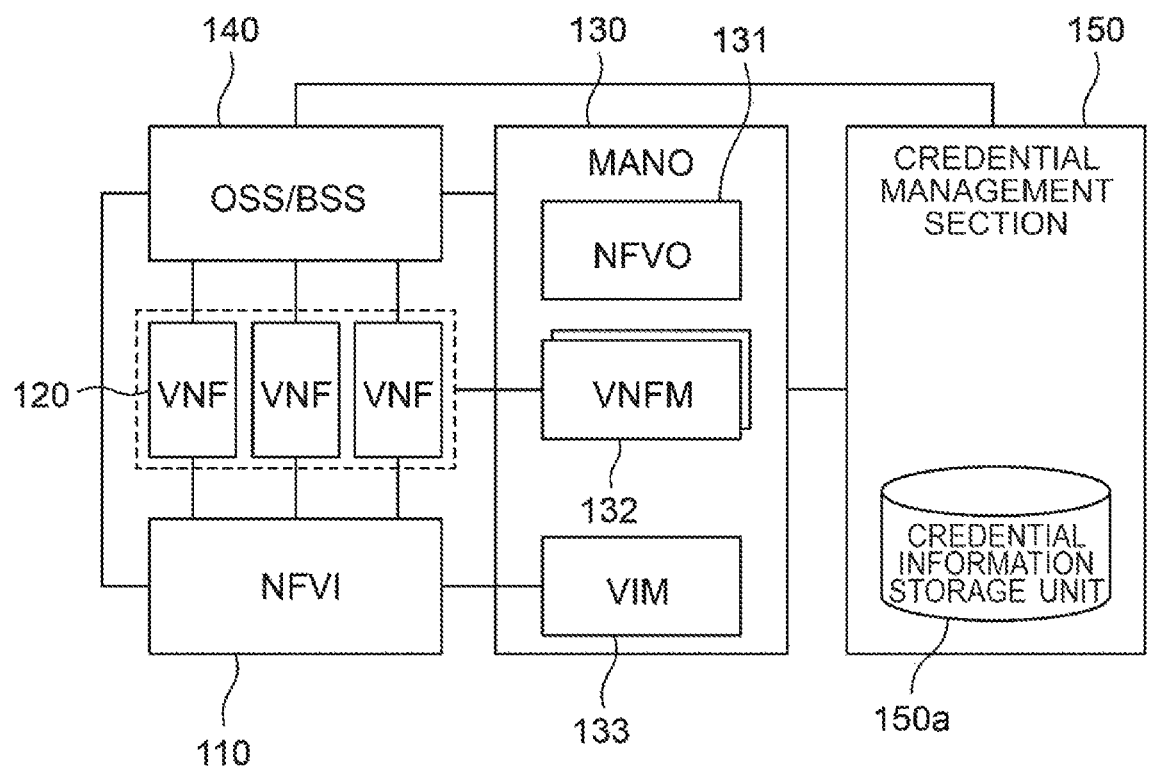
FIG. 2 is a block diagram illustrating an exemplary internal configuration of a credential management system.

FIG. 2 is a block diagram illustrating an exemplary internal configuration of a credential management system that constitutes the mobile network 100.

Each of constituent elements shown in FIG. 2 has a reference point. The lines connecting the constituent components shown in FIG. 2 indicate that connected constituent elements can send and receive information with each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Virtual Network Function) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, and renders these hardware resources into virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers (i.e., accommodating stations) 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on Virtual Machines (VMs) on the servers and implements the network functions by software. Although not specifically shown, each VNF 120 may be provided with a management function called an Element Manager (EM).

The NFVI 110 and the VNF 120 in FIG. 2 constitute the virtualized environment. In other words, the virtualized environment is constituted with three layers, in the bottom-up order namely: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of the VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources used by the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The credential management section 150 realizes the credential management function that manages the credential information of components that constitute the mobile network 100. Here, the above components are referred to as devices or functions that may be subject to maintenance, and include servers, switches, routers, applications, and the like, deployed in the base stations 11, the edge data centers 12, or the regional data centers 13, respectively.

The credential management section 150 serves as the credential management apparatus according to the present embodiment.

The credential management section 150 may be equipped with a credential information storage unit 150*a* that stores the credential information of the above components.

The credential information storage unit 150*a* encrypts and stores, as the credential information, authentication information such as passwords, which are used when users (e.g., administrators or maintenance operators) access the target components. The credential information may be set for each of components. Alternatively, the credential information may be set for multiple components (e.g., for each data center).

The credential information stored in the credential information storage unit 150*a* may be set for, for example, each of users. Alternatively, the credential information may be set for multiple users (e.g., for each department).

The credential information may also include any information that needs to be strictly controlled for access, such as API encryption keys, certificates, and the like.

Usually, the credential management section 150 automatically generates new credential information and changes the credential information stored in the credential information storage unit 150*a* with the new credential information at predetermined times (hereinafter referred to as "rotation"). This ensures a high level of security.

However, if such rotation processing of the credential information is automatically performed independently of the intentions and operations of a maintenance operator, the maintenance operator does not know when the credential information is to be changed. For this reason, the credential information may be automatically changed during the maintenance operation being performed.

For example, when the credential information is changed during a maintenance operation of servers, an operator will not be able to log in to a server during the maintenance operation, thereby interrupting the maintenance operation. Furthermore, in order to continue the maintenance operation, the maintenance operator needs to access the credential management section 150 to confirm the new credential information, which increases the amount of extra work. This results in an increase in time required for maintenance operations, and in the case of a maintenance operation to deal with failures, an increase in network outage time.

Yet for example, in the case of a planned maintenance operation, such as adding or changing functions in the mobile network 100, a maintenance operator is able to perform the planned maintenance operation avoiding a time of changing the credential information, as long as the maintenance operator knows the schedule of the rotation processing.

On the other hand, however, there are cases where a maintenance operation is required unexpectedly in the mobile network 100, for example, to deal with server failures. Since the mobile network 100 has high reliability and high availability requirements, when a failure occurs, a restoration operation is required to be performed expeditiously in order to minimize the impact on services. Therefore, even if a maintenance operator knows the schedule of the rotation processing and thus knows that the credential information will be changed due to the rotation processing during the maintenance operation, the maintenance operator is still forced to perform the maintenance operation.

To cope with the above drawback, according to the present embodiment, the credential management section 150 locks the credential information of a target component for the maintenance operation so as not to be changed while the maintenance operation is being performed.

It should be noted that the credential management section 150 is not limited to being an external function of the OSS/BSS 140 or the MANO 130 as shown in FIG. 2. The credential management section 150 may be provided inside the OSS/BSS 140, or alternatively inside the MANO 130. In this case, the credential management function of the credential management section 150 is a part of the functions of the OSS/BSS 140 or the MANO 130.

Figure 3:
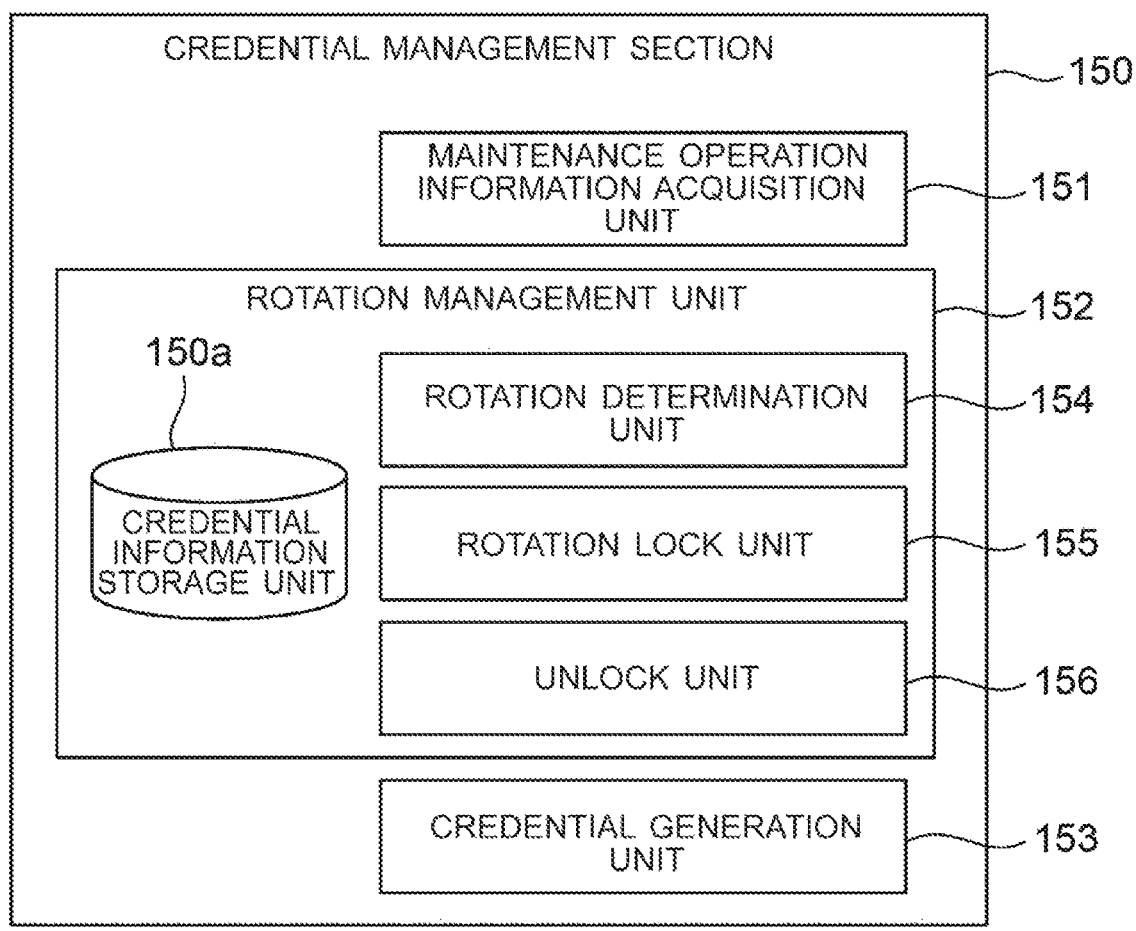
FIG. 3 is a block diagram illustrating an exemplary functional configuration of a credential management section.

FIG. 3 is a block diagram illustrating an exemplary functional configuration of the credential management section 150.

As shown in FIG. 3, the credential management section 150 includes a maintenance operation information acquisition unit 151, a rotation management unit 152, and a credential generation unit 153. The rotation management unit 152 further includes a rotation determination unit 154, a rotation lock unit 155 and an unlock unit 156.

The maintenance operation information acquisition unit 151 acquires maintenance operation information registered by operators who perform maintenance operations.

Here, the maintenance operation information includes information of a target component for a maintenance operation. In addition, the maintenance operation information may include a scheduling notice indicating that a maintenance operation is scheduled to be performed and a completion notice indicating that a maintenance operation has been completed. The above scheduling notice may include information indicating only whether or not a maintenance operation is scheduled to be performed, or alternatively may include information related to an operation time, such as the start time of the maintenance operation, the scheduled end time of the maintenance operation, and the scheduled duration of the maintenance operation.

Furthermore, the maintenance operation information may include information related to an operator who performs the maintenance operation (e.g., operator ID, or the like). When multiple operators are involved in performing the maintenance operation, the maintenance operation information may include information about the multiple operators.

The rotation management unit 152 manages the rotation processing that periodically changes the credential information stored in the credential information storage unit 150*a*.

The rotation determination unit 154 determines whether or not it is time to change the credential information based on the elapsed time since the last time the credential information was changed. If the rotation determination unit 154 determines that a predetermined period of time has elapsed since the last time the credential information was changed, the rotation determination unit 154 determines that it is time to change the credential information and sends a request for generating the credential information to the credential generation unit 153.

However, the rotation determination unit 154 determines, based on the maintenance operation information acquired by the maintenance operation information acquisition unit 151, to lock a rotation so as not to change the credential information at least while the maintenance operation is being performed.

For example, the rotation determination unit 154 determines to lock the rotation at a time when the scheduling notice is acquired, which is included in the maintenance operation information. Subsequently, the rotation determination unit 154 determines to unlock the rotation at a predetermined time after the rotation has been locked. For example, the rotation determination unit 154 determines to unlock the rotation at a time when the completion notice is acquired, which is included in the maintenance operation information.

At this time, the rotation determination unit 154 determines, as a target of the rotation lock, the credential information of the target component for the maintenance operation.

When the maintenance operation information includes information related to an operator who performs the maintenance operation, the rotation determination unit 154 may determine the credential information associated with the operator to be the target of the rotation lock.

The rotation lock unit 155 locks the rotation based on the result of the determination by the rotation determination unit 154. For example, when the rotation determination unit 154 determines to lock the rotation, the rotation lock unit 155 prevents the request for generating the credential information from being sent to the credential generation unit 153.

The unlock unit 156 unlocks the rotation based on the result of the determination by the rotation determination unit 154. For example, when the rotation determination unit 154 determines to unlock the rotation, the unlock unit 156 permits the request for generating the credential information to be sent to the credential generation units 153.

The credential generation unit 153 generates new credential information according to the request for generating the credential information from the rotation management unit 152 and, sends the generated credential information to the rotation management unit 152. The new credential information is then stored in the credential information storage unit 150*a*, and the new credential information is thereafter applied.

It should be noted that, when the rotation determination unit 154 determines to lock the rotation, the rotation lock unit 155 may lock the rotation by preventing the new credential information, which is sent from the credential generation unit 153, from being stored in the credential information storage unit 150*a*.

Similarly, when the rotation determination unit 154 determines to unlock the rotation, the unlock unit 156 may unlock the rotation by permitting the new credential information, which is sent from the credential generation unit 153, to be stored in the credential information storage unit 150*a*.

The configuration of the functional blocks of the credential management section 150 shown in FIG. 3 is exemplary only, and multiple functional blocks may constitute one functional block, or any of the functional blocks may be divided into multiple blocks that perform multiple functions.

In addition, the multiple functions of the credential management section 150 may be divided into external functions of the OSS/BSS 140 and the MANO 130, internal functions of the OSS/BSS 140, and internal functions of the MANO 130 of the credential management system shown in FIG. 2, respectively.

Figure 4:
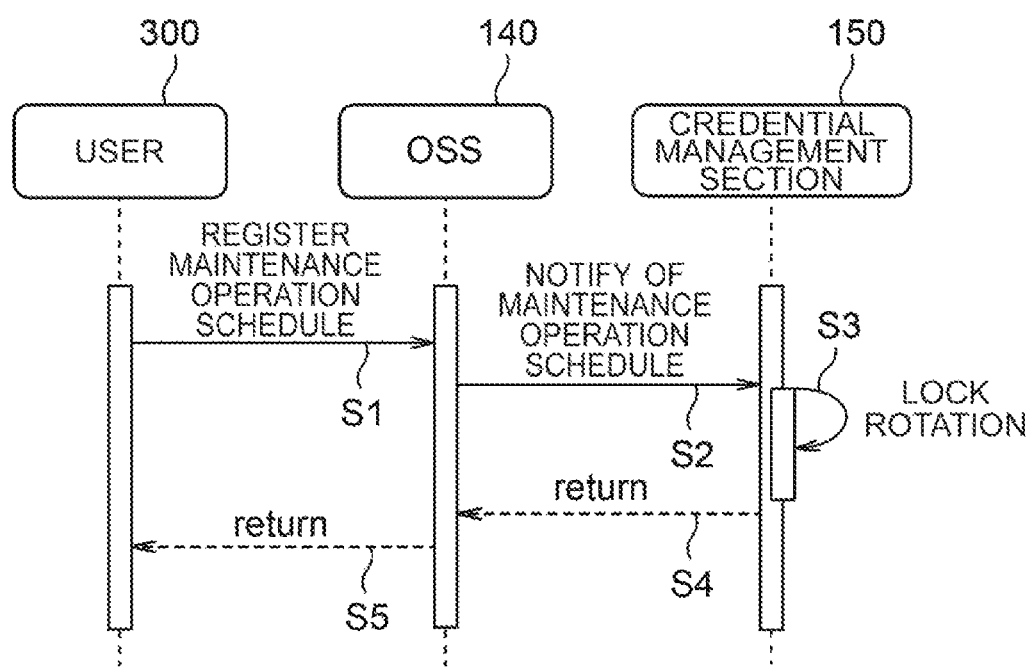
FIG. 4 is a sequence diagram illustrating an exemplary operation for locking rotations.

FIG. 4 is a sequence diagram illustrating an exemplary operation for locking rotations performed by the credential management section 150.

When a certain failure occurs in the mobile network 100, it is required to perform a maintenance operation to deal with the failure concerned. At this time, in step S1, a user (e.g., maintenance operator) 300 registers a schedule for the maintenance operation with respect to the OSS 140.

Upon receiving the schedule for the maintenance operation from the user 300, in step S2, the OSS 140 sends the maintenance operation information, which includes a scheduling notice of the maintenance operation, to the credential management section 150.

In step S3, the credential management section 150 acquires the maintenance operation information sent from the OSS 140 and checks the scheduling notice included in the maintenance operation information. Subsequently, the credential management section 150 locks the rotation so as not to change the credential information that is related to the target component for the maintenance operation and also associated with the operator who performs the maintenance operation, among the credential information stored in the credential information storage unit 150a.

In step S4, the credential management section 150 sends the OSS 140 a notice indicating that the rotation is locked. Upon receiving the notice, in step S5, the OSS 140 presents the notice to the user 300. This allows the user 300 to confirm that the rotation has been locked so as to start the maintenance operation.

Figure 5:
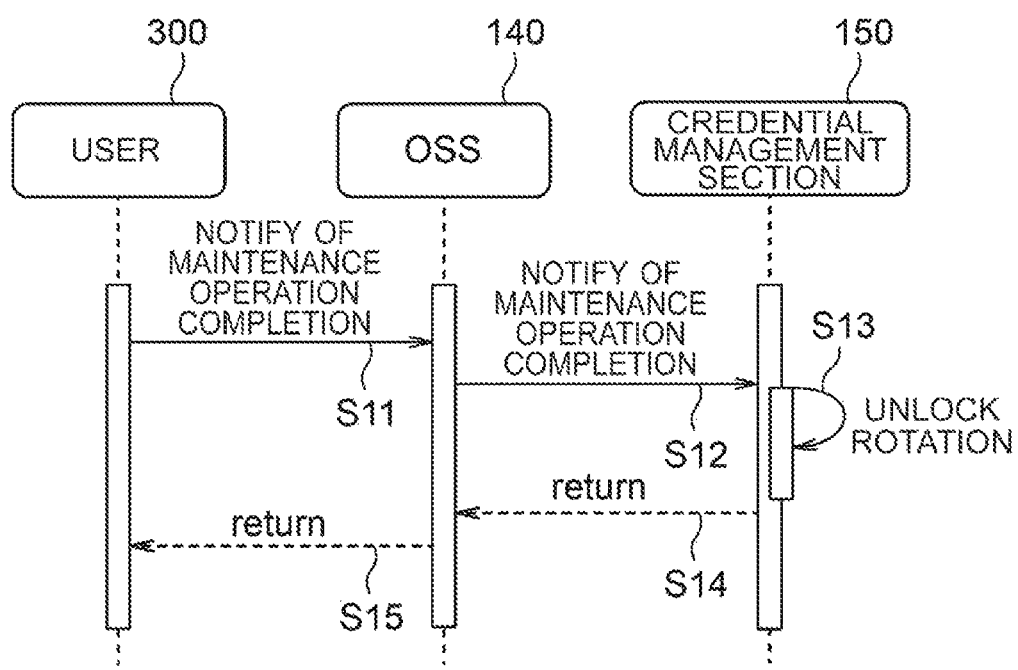
FIG. 5 is a sequence diagram illustrating an exemplary operation for unlocking rotations.

FIG. 5 is a sequence diagram illustrating an exemplary operation for unlocking rotations performed by the credential management section 150.

When the maintenance operation is completed, in step S1, the user 300 registers a completion notice of the maintenance operation with respect to the OSS 140.

Upon accepting the completion notice of the maintenance operation from the user 300, in step S12, the OSS 140 sends the maintenance operation information including the completion notice of the maintenance operation to the credential management section 150.

In step S13, the credential management section 150 acquires the maintenance operation information sent from the OSS 140 and checks the completion notice included in the maintenance operation information. Subsequently, the credential management section 150 unlocks the rotation.

In step S14, from the credential management section 150 sends the OSS 140 a notice indicating that the rotation is unlocked. Upon receiving the notice, in step S15, the OSS 140 presents the notice to the user 300. This allows the user 300 to confirm that the rotation has been unlocked.

In this way, the credential management section 150 is able to lock the rotation for an entire period between when the user 300 registers the scheduling notice, which indicates that the maintenance operation is scheduled, and when the user 300 registers the completion notice, which indicates that the maintenance operation is completed. This ensures to prevent the credential information from being automatically changed while the maintenance operation is being performed.

However, in this case, assuming that the user 300 incidentally forgets to register the completion notice of the maintenance operation, it would be impossible to unlock the rotation.

Therefore, the credential management section 150 may automatically unlock the rotation when the credential management section 150 has not acquired the completion notice of the maintenance operation after a certain period of time has elapsed since the rotation was locked.

Figure 6:
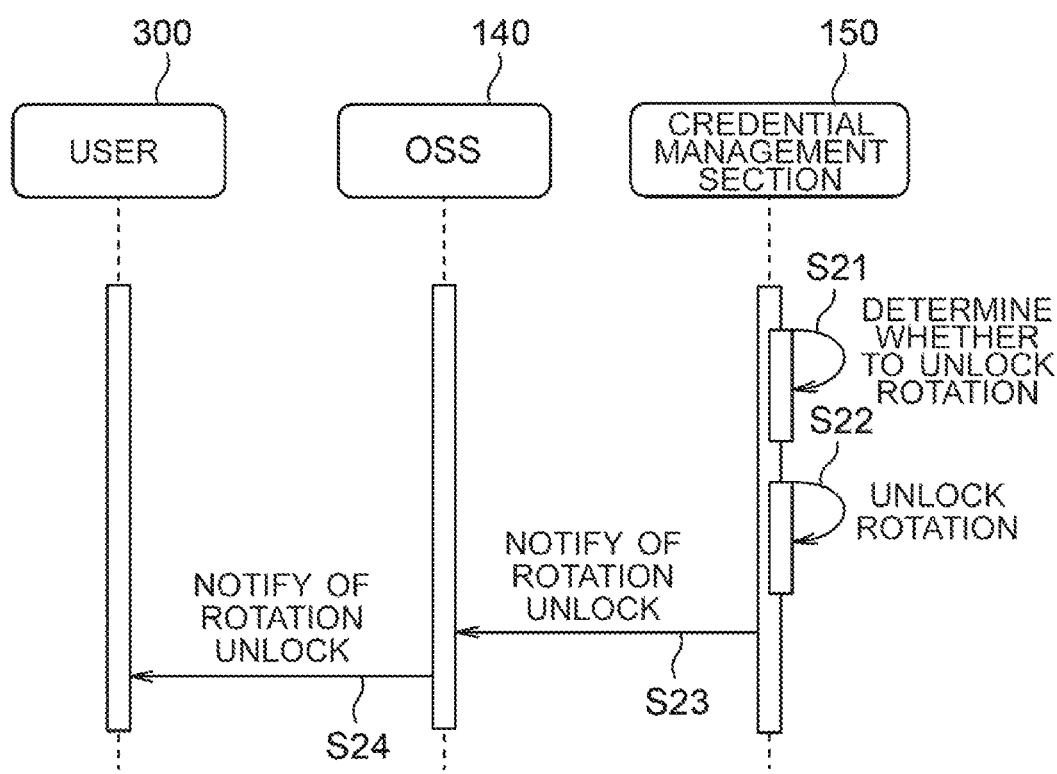
FIG. 6 is a sequence diagram illustrating another exemplary operation for unlocking rotations.

FIG. 6 is a sequence diagram illustrating an exemplary operation for unlocking rotations when unlocking the rotation after a certain period of time has elapsed since the rotation was locked.

After locking the rotation, in step S21, the credential management section 150 performs determination processing to determine whether or not to unlock the rotation.

When a certain period of time has elapsed since the rotation was locked, the credential management section 150 determines to unlock the rotation at that time, and in step S22, unlocks the rotation. Here, the above certain period of time is set to be longer than the scheduled operation period for the maintenance operation. The above certain period may be, for example, one day.

It should be noted that the above certain period of time may be a fixed period predetermined based on the average time of maintenance operations, or alternatively, may be a period dynamically set based on the scheduled operation period included in the maintenance operation information registered by the user 300.

In step S23, the credential management section 150 sends the OSS 140 a notice indicating that the rotation has been unlocked. Upon receiving the notice, in step S24, the OSS 140 presents the notice to the user 300. This allows the user 300 to confirm that the rotation has been unlocked.

In this case, the credential management section 150 is able to lock the rotation for an entire period between when the user 300 registers the scheduling notice, which indicates that the maintenance operation is scheduled, and when a certain period of time has elapsed that is longer than the scheduled operation period for the maintenance operation.

Also in this case, it ensures to prevent the credential information from being automatically changed while the maintenance operation is being performed. In addition, in this case, it makes it possible to automatically unlock the rotation without requiring the completion notice of the maintenance operation from the user 300.

Hereinafter, an operation performed by the credential management section 150 will be described in more detail.

Figure 7:
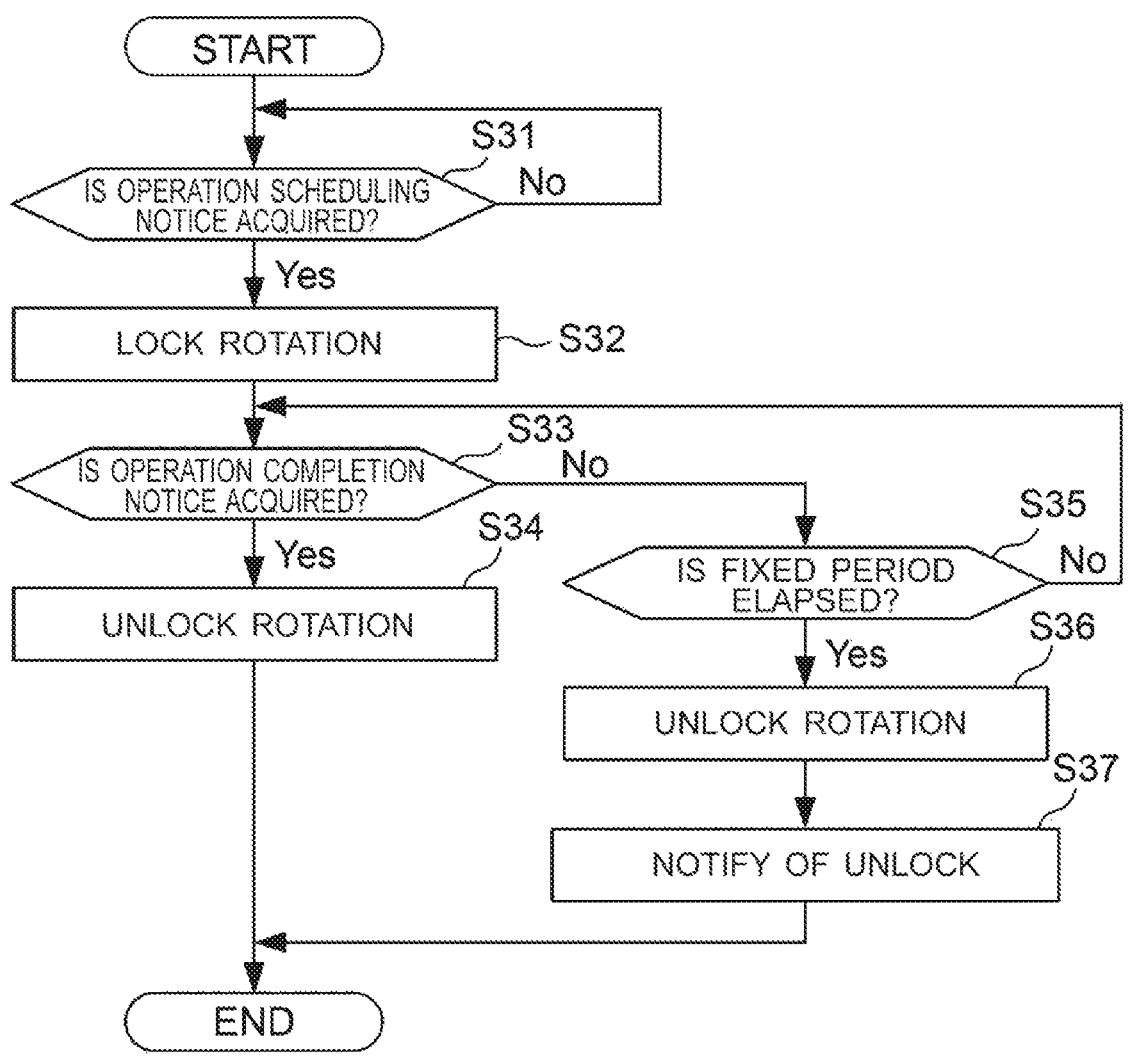
FIG. 7 is a flowchart illustrating an exemplary processing procedure of rotation lock determination processing.
Figure 8:
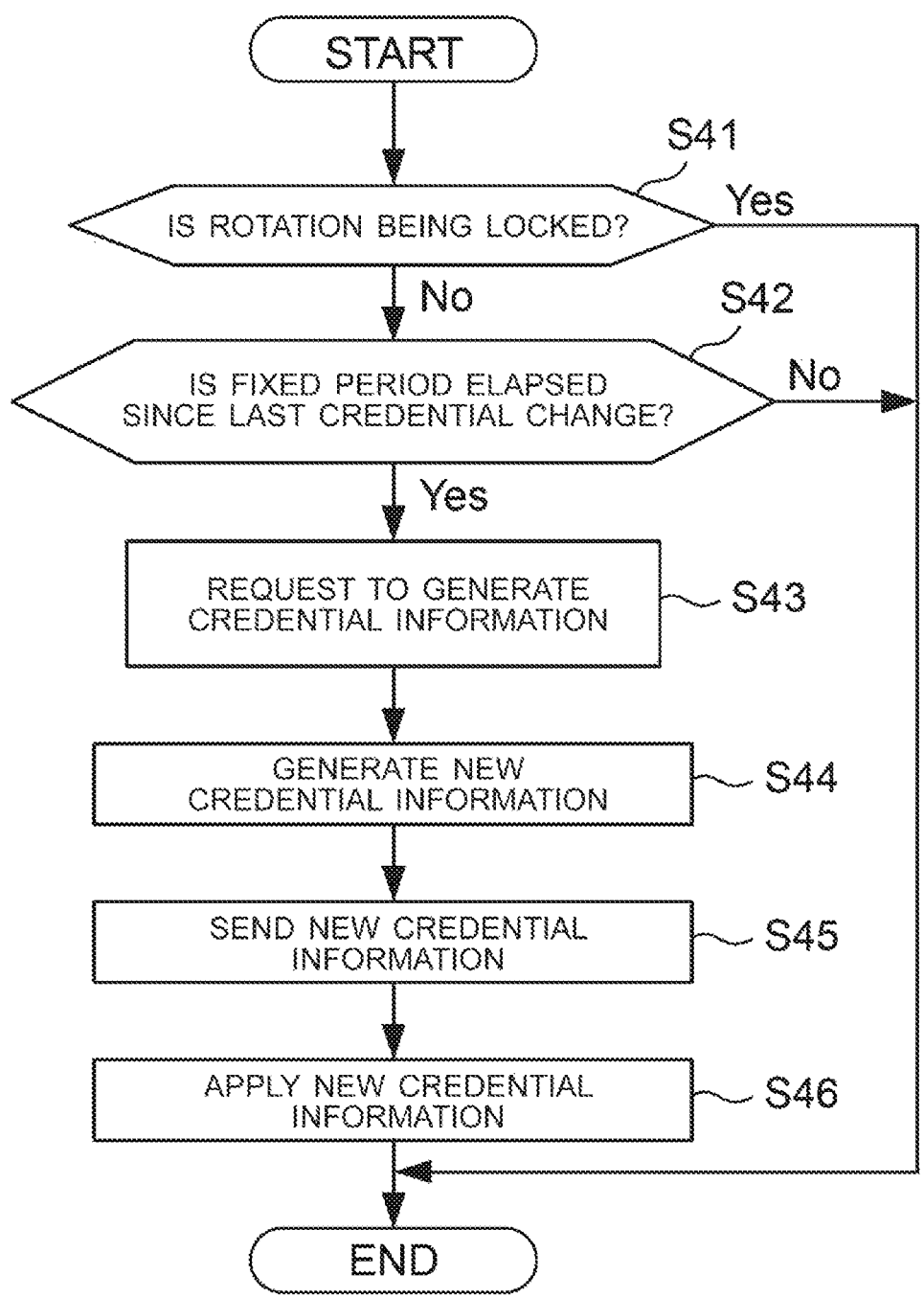
FIG. 8 is a flowchart illustrating an exemplary processing procedure of rotation processing.

The credential management section 150 performs the processing shown in FIG. 7 and FIG. 8 and manages the credential information.

FIG. 7 is a flowchart illustrating an exemplary processing procedure of rotation lock determination processing performed by the credential management section 150. The processes shown in FIG. 7 are performed iteratively.

First, in step S31, the rotation determination unit 154 determines whether or not the scheduling notice of a maintenance operation is acquired. Subsequently, when the scheduling notice is determined not to be acquired, the rotation determination unit 154 stays on standby. When the scheduling notice is determined to be acquired, the processing proceeds to step S32.

In step S32, the rotation determination unit 154 determines to lock the rotation and sends a locking instruction to the rotation lock unit 155. The locking instruction includes, as information on the credential information that is a target of locking the rotation, information of a target component for the maintenance operation, information associated with an operator who performs the maintenance operation, and the like. Subsequently, the rotation lock unit 155 locks the target credential information not to be changed according to the locking instruction received from the rotation determination unit 154.

Next, in step S33, the rotation determination unit 154 determines whether or not the completion notice of the maintenance operation is acquired. Subsequently, when the completion notice is determined to be acquired, the processing proceeds to step S34, and the rotation determination unit 154 determines to unlock the rotation and sends an unlocking instruction to the unlock unit 156. The unlocking instruction includes information on the credential information that is a target of unlocking the rotation. Subsequently, the unlock unit 156 unlocks the rotation of the target credential information according to the unlocking instruction received from the rotation determination unit 154.

On the other hand, when the completion notice is determined not to be acquired in step S33, the processing proceeds to step S35, and the rotation determination unit 154 determines whether or not a certain period of time has elapsed since the rotation was locked. Subsequently, when the rotation determination unit 154 determines that a certain period of time has not yet elapsed since the rotation was locked, the processing returns to step S33, and when the rotation determination unit 154 determines that a certain period of time has elapsed, the processing proceeds to step S36.

In step S36, the rotation determination unit 154 determines to unlock the rotation and send the unlocking instruction to the unlock unit 156. Subsequently, the unlock unit 156 unlocks the rotation of the target credential information according to the unlocking instruction received from the rotation determination unit 154.

In step 537, the rotation management unit 152 sends a user 300 an unlock notice to notify that the rotation has been unlocked.

FIG. 8 is a flowchart illustrating an exemplary processing procedure of rotation processing performed by the credential management section 150. Those processes shown in FIG. 8 are performed periodically (e.g., once a day) at predetermined time intervals.

First, in step S41, the rotation determination unit 154 determines whether or not the rotation is being locked. When the rotation is determined to be being locked, the rotation determination unit 154 terminates the processing, and when the rotation is determined not to be being locked, the processing proceeds to step S42.

In step S42, the rotation determination unit 154 determines whether or not a predetermined period of time has elapsed since the last time the credential information was changed. Here, the above predetermined period of time may be, for example, one month.

Subsequently, when it is determined that a predetermined period of time has not yet elapsed since the last time the credential information was changed, the rotation determination unit 154 determines that it is not the right time to perform the rotation processing and terminates the processing. On the other hand, when it is determined that a predetermined period of time has elapsed since the last time the credential information was changed, the rotation determination unit 154 determines that it is the right time to perform the rotation processing and the processing proceeds to step S43.

In step S43, the rotation determination unit 154 sends a request for generating the credential information to the credential generation unit 153.

In step S44, the credential generation unit 153 generates new credential information in response to the request for generating the credential generation sent in step S43.

In step S45, the credential generation unit 153 sends the new credential information generated in step S44 to the rotation management unit 152.

In step 546, the rotation management unit 152 updates the credential information stored in the credential information storage unit 150a with the new credential information sent in step S45 so as to apply the new credential information.

As described above, the credential management section 150, which serves as the credential management apparatus according to the present embodiment, has the rotation function that periodically changes the credential information of components that constitute the network. However, the credential management section 150 acquires the maintenance operation information of maintenance operations on the network, and based on the maintenance operation information, locks the rotation so as not to change the credential information of a target component for the maintenance operation at least while the maintenance operation is being performed.

In this way, the credential management section 150 according to the present embodiment nails the credential information of the target component for the maintenance operation to be unchanged while the maintenance operation is being performed. Thus, it makes it possible to prevent the credential information from being changed while the maintenance operation is being performed, thereby avoiding interruption to maintenance operations due to inaccessibility to the target component for the maintenance operation while the maintenance operation is being performed as well as extra operations to check the new credential information. As a result, it makes it possible to suppress the maintenance operation time and maintenance operation man-hours from increasing, and in the case of dealing with failures, to suppress the time required for recovery (i.e., network outage time) from increasing.

It should be noted that it may be conceivable to change the credential information to default values while maintenance operation is being performed and disable the credential information management for a certain period of time. However, this would entail security problems. According to the present embodiment, since the rotation of the credential information is locked, it makes it possible to avoid adverse impacts on maintenance operations while ensuring security.

In addition, since the credential management section 150 solely locks the credential information of a target component for the maintenance operation, it makes it possible to avoid unnecessarily locking the credential information of other components that are not to be maintained.

Furthermore, when the maintenance operation information includes a scheduling notice indicating that a maintenance operation is scheduled, the credential management section 150 is able to lock the credential information at a time when the credential management section 150 acquires the scheduling notice. Thus, it makes it possible to lock the rotation without fail before the maintenance operation is started.

Here, the above maintenance operation information may be information registered by a user who is a maintenance operator. In this case, it is possible to lock the rotation of the credential information based on an instruction issued by the maintenance operator. Since manipulating the credential information is highly relevant to security, it is common to design specifications to be unable to manipulate the credential information by operators. According to the present embodiment, it allows maintenance operators to manipulate the credential information solely during maintenance operations being performed. Thus, it makes it possible for maintenance operators to manipulate the credential information and perform maintenance operations appropriately, even when a maintenance operation is required to be performed immediately due to unexpected failure handling.

Yet furthermore, when the maintenance operation information includes information on an operator who performs the maintenance operation, the credential management section 150 may lock the credential information associated with the operator. In other words, the credential management section 150 may lock solely the credential information associated with the maintenance operator among the credential information of the target component for the maintenance operation.

In this case, it makes it possible to avoid unnecessarily locking other operators' credential information so as to ensure security.

Yet furthermore, the credential management section 150 is able to unlock the credential information at a predetermined time after the credential information being locked. Thus, it makes it possible to restore the original level of security.

More specifically, when the maintenance operation information includes a completion notice indicating that the maintenance operation has been completed, the credential management section 150 may unlock the credential information at a time when the completion notice is acquired. In this case, it makes it possible to keep the credential information unchanged during the maintenance operation being performed, and subsequently resume the rotation of the credential information appropriately after the maintenance operation is completed.

Here, the above maintenance operation information may be information registered by a user who is a maintenance operator. In this case, it makes it possible to unlock the rotation of the credential information based on an instruction issued by the maintenance operator.

Yet furthermore, the credential management section 150 may unlock the rotation at a certain time after a predetermined period of time has elapsed since the credential information was locked. In this case, it makes it possible to unlock the rotation appropriately even when a maintenance operator incidentally forgets to register the completion notice of the maintenance operation and when failing in acquiring the completion notice for whatever reason.

Here, when the credential management section 150 acquires the maintenance operation information that includes information indicating the scheduled operation period for a maintenance operation, the credential management section 150 may unlock the rotation at a time when a predetermined period of time longer than the above scheduled operation period has elapsed after the credential information was locked. In this case, it makes it possible to prevent the rotation from being unlocked during the maintenance operation being performed.

As described above, according to the present embodiment, since the credential management apparatus locks the credential information of a target component for the maintenance operation so as not to be changed while the maintenance operation is being performed, it makes it possible to suppress the maintenance operation time and maintenance operation man-hours from increasing, as well as network outage time from increasing. As a result, it makes it possible to achieve high reliability and high availability in large-scale networks.

The credential management apparatus according to the present embodiment may be implemented in any of general-purpose servers that constitute the backhaul network, the core network, or the like, of the mobile network 100. Alternatively, the credential management apparatus may be implemented in a dedicated server. The credential management apparatus may also be implemented on a single or a plurality of computers.

Figure 9:
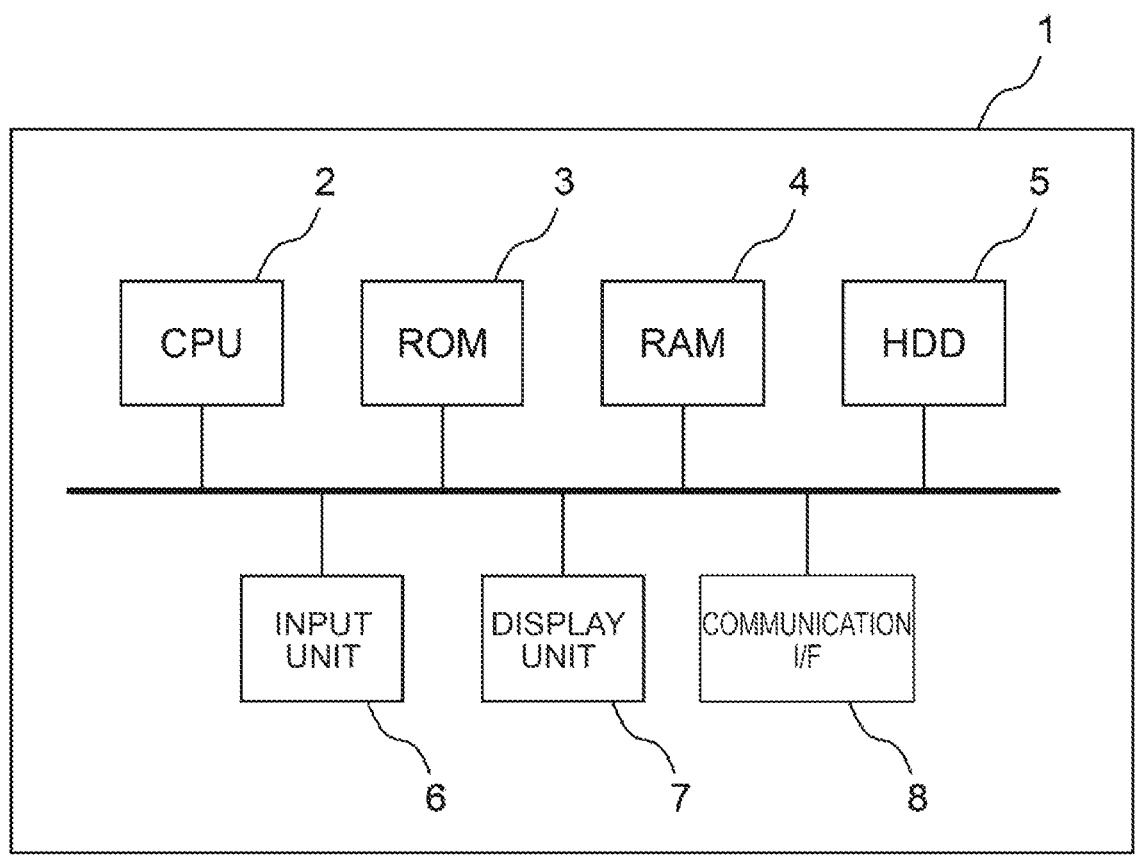
FIG. 9 is a block diagram illustrating an exemplary hardware configuration of the credential management apparatus.

When the credential management apparatus is implemented on a single computer, as shown in FIG. 9, the credential management apparatus 1 may include a CPU 2, a ROM 3, a RAM 4, an HDD 5, an input unit (such as a keyboard, a pointing device) 6, a display unit (such as a monitor device) 7, a communication I/F 8, and the like. The credential management apparatus 1 may further include an external memory.

The CPU (Central Processing Unit) 2 is constituted with one or more processors and controls entire operations of the credential management apparatus 1 in a comprehensive manner. At least a part of functions of respective components of the credential management section 150 shown in FIG. 3 may be implemented by the CPU 2 running programs. It should be noted that those programs may be stored in a non-volatile memory such as the ROM (Read Only Memory) 3, the HDD (Hard Disk Drive) 5, or the like, or alternatively, may be stored in the external memory such as a removable storage medium (not shown).

However, at least a part of the functions of the respective components of the credential management section 150 shown in FIG. 3 may be operated by dedicated hardware. In this case, operation of the dedicated hardware is under the control of the CPU 2 described above.

For functions realized by hardware, for example, by using a prescribed compiler, for example, a dedicated circuit can be generated automatically on an FPGA from the programs to realize the functions of respective functional modules by using a predetermined compiler. Furthermore, a gate array circuit may be formed in the same way as the FPGA and realized as hardware, or alternatively, an ASIC (Application Specific Integrated Circuit) may be used.

Embodiments of the present disclosure may include a computer-readable storage medium that stores programs, and the programs may include instructions that, when being executed by the CPU 2 (e.g., at least one of the one or more processors) of the credential management apparatus 1, causes the credential management apparatus 1 to perform at least one of the methods described above.

Although exemplary embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

Embodiments of Present Disclosure

The present disclosure includes the following embodiments.

[1] A credential management apparatus, comprising one or more processors, at least one of the one or more processors being configured to perform: a change process for periodically changing credential information of components that constitute a network; an acquisition process for acquiring maintenance operation information related to a maintenance operation of the network; and a locking process for locking the credential information of, among the components, a target component for the maintenance operation not to be changed based on the maintenance operation information, at least during the period while the maintenance operation is being performed.

[2] The credential management apparatus according to [1], wherein, when the maintenance operation information includes a scheduling notice indicating that the maintenance operation is scheduled, the locking process locks the credential information at a time when the scheduling notice is acquired.

[3] The credential management apparatus according to [1] or [2], wherein, when the maintenance operation information includes information related to an operator performing the maintenance operation, the locking process locks the credential information associated with the operator.

[4] The credential management apparatus according to any one of [1] to [3], at least one of the one or more processors further being configured to perform: an unlocking process for unlocking the credential information at a predetermined time after the credential information is locked by the locking process.

[5] The credential management apparatus according to [4], wherein, when the maintenance operation information includes a completion notice indicating that the maintenance operation has been completed, the unlocking process unlocks the credential information at a time when the completion notice is acquired.

[6] The credential management apparatus according to [4] or [5], wherein the unlock process unlocks the credential information after a predetermined period of time has elapsed since the credential information was locked.

[7] The credential management apparatus according to [6], wherein the acquisition process acquires the maintenance operation information including information indicating a scheduled operation period of the maintenance operation, and the unlocking process unlocks the credential information after the predetermined period of time that is longer than the scheduled operation period has elapsed.

[8] A credential management method, comprising: acquiring maintenance operation information related to a maintenance operation of a network; and locking, among components that constitute the network, credential information of a target component for the maintenance operation not to be changed based on the maintenance operation information, at least during the period while the maintenance operation is being performed.

[9] A credential management system, comprising one or more processors, at least one of the one or more processors being configured to perform: a change process for periodically changing credential information of components that constitute a network; an acquisition process for acquiring maintenance operation information related to a maintenance operation of the network; and a locking process for locking the credential information of, among the components, a target component for the maintenance operation not to be changed based on the maintenance operation information, at least during the period while the maintenance operation is being performed.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: Credential Management Section; 150a: Credential Information Storage Unit; 151: Maintenance Operation Acquisition Unit; 152: Rotation Management Unit; 153: Credential Generation Unit; 154: Rotation Determination Unit; 155: Rotation Lock Unit; 156: Unlock Unit

What is claimed is:

1. A credential management apparatus comprising one or more processors, at least one of the one or more processors being configured to:
periodically change credential information of components that constitute a network, the components comprising a target component;
acquire maintenance operation information related to a maintenance operation of the network; and
lock credential information of the target component for the maintenance operation based on the maintenance operation information such that the credential information of the target component remains unchanged, at least during performance of the maintenance operation,
wherein the periodically changing of the credential information of components is based on a request to generate new credential information of components sent to other processors of the one or more processors, the credential information of the components being changed to the new credential information of components, and
wherein the request to generate new credential information of the target component is prevented from being sent to the other processors of the one or more processors by the locking of the credential information of the target component for the maintenance operation.

2. The credential management apparatus according to claim 1, wherein,
when the maintenance operation information includes a scheduling notice indicating that the maintenance operation is scheduled, the at least one of the one or more processors is further configured to lock the credential information at a time when the scheduling notice is acquired.

3. The credential management apparatus according to claim 1, wherein,
when the maintenance operation information includes information related to an operator performing the maintenance operation, the at least one of the one or more processors is further configured to lock the credential information associated with the operator.

4. The credential management apparatus according to claim 1, the at least one of the one or more processors is further configured to unlock the credential information at a predetermined time after the credential information is locked.

5. The credential management apparatus according to claim 4, wherein,
when the maintenance operation information includes a completion notice indicating that the maintenance operation has been completed, the at least one of the one or more processors is further configured to unlock the credential information at a time when the completion notice is acquired.

6. The credential management apparatus according to claim 4, wherein the at least one of the one or more processors is further configured to unlock the credential information after a predetermined period of time has elapsed since the credential information was locked.

7. The credential management apparatus according to claim 6, wherein the at least one of the one or more processors is further configured to:
acquire the maintenance operation information including information indicating a scheduled operation period of the maintenance operation; and
unlock the credential information after the predetermined period of time that is longer than the scheduled operation period has elapsed.

8. A credential management method, comprising:
periodically changing credential information of components that constitute a network, the components comprising a target component;
acquiring maintenance operation information related to a maintenance operation of a network; and
locking credential information of a target component for the maintenance operation based on the maintenance operation information such that the credential information of the target component remains unchanged, at least during performance of the maintenance operation, wherein the periodically changing of the credential information of components is based on a request to generate new credential information of components sent to a processor, the credential information of the components being changed to the new credential information of components, and wherein the requesting to generate new credential information of the target component is prevented from being sent to the processor by the locking of the credential information of the target component for the maintenance operation.

9. A credential management system comprising one or more processors, at least one of the one or more processors being configured to:

periodically change credential information of components that constitute a network, the components comprising a target component;

acquire maintenance operation information related to a maintenance operation of the network; and lock credential information of the target component for the maintenance operation based on the maintenance operation information such that the credential information of the target component remains unchanged, at least during performance of the maintenance operation, wherein the periodically changing of the credential information of components is based on a request to generate new credential information of components sent to other processors of the one or more processors, the credential information of the components being changed to the new credential information of components, and wherein the request to generate new credential information of the target component is prevented from being sent to the other processors of the one or more processors by the locking of the credential information of the target component for the maintenance operation.

* * * * *